(12) United States Patent
Duggan

(10) Patent No.: US 6,909,548 B2
(45) Date of Patent: Jun. 21, 2005

(54) OPTICAL FILTER USING A LINEAR VARIABLE FILTER WITH ELLIPTICAL BEAM GEOMETRY

(75) Inventor: Philip Patrick Duggan, Nepean (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 10/059,413

(22) Filed: Jan. 31, 2002

(65) Prior Publication Data

US 2002/0191294 A1 Dec. 19, 2002

Related U.S. Application Data

(60) Provisional application No. 60/297,532, filed on Jun. 13, 2001.

(51) Int. Cl.[7] .............................................. G02B 27/00
(52) U.S. Cl. ...................................... 359/578; 359/589
(58) Field of Search ................................. 359/578, 589; 398/85

(56) References Cited

U.S. PATENT DOCUMENTS

| | | | |
|---|---|---|---|
| 5,159,199 A | 10/1992 | LaBaw | 250/339 |
| 5,166,755 A | 11/1992 | Gat | 356/419 |
| 5,218,473 A | 6/1993 | Seddon et al. | 359/589 |
| 5,731,583 A | 3/1998 | Bailey et al. | 250/343 |
| 5,793,545 A | 8/1998 | Monfre et al. | 359/891 |
| 5,872,655 A | 2/1999 | Seddon et al. | 359/588 |
| 6,057,925 A | 5/2000 | Anthon | 356/419 |
| 6,115,401 A | 9/2000 | Scobey et al. | 372/100 |
| 6,320,996 B1 * | 11/2001 | Scobey et al. | 385/18 |
| 6,590,655 B2 * | 7/2003 | Welch et al. | 356/369 |

* cited by examiner

Primary Examiner—Mark A. Robinson
Assistant Examiner—Alessandro Amari
(74) Attorney, Agent, or Firm—Teitelbaum & MacLean; Neal Teitelbaum; Doug MacLean

(57) ABSTRACT

This invention relates to a new optical geometry for using a linear variable filter as an optical spectral filter. An elliptical beam geometry with the minor beam axis oriented along the linearly varying axis of the filter is used. The beam is incident at a slight angle relative to the long axis of the beam. Ultimately this geometry produces a filter which has minimum spectral broadening from both angular and beam extent effects. Furthermore, this geometry results in low back reflectance and higher input beam power damage thresholds. The optical filter includes means for tuning a wavelength response of the filter. Further, the optical filter can afford Add/Drop functionality by providing optical circulators at the input and output ports.

27 Claims, 13 Drawing Sheets

OPTICAL FILTER USING A LINEAR VARIABLE FILTER WITH ELLIPTICAL BEAM GEOMETRY

CROSS-REFERENCE TO RELATED APPLICATIONS

This applications claims priority from application Ser. No. 60/297,532, filed on Jun. 13, 2001, entitled "Tunable Filter Using Linear Variable Filter With Elliptical Beam Geometry" by Philip Duggan.

STATEMENT REGARDING FEDERALLY SPONSORED RESEARCH OR DEVELOPMENT

Not applicable

REFERENCE TO MICROFICHE APPENDIX

Not Applicable

FIELD OF THE INVENTION

The present invention relates generally to the field of optical filters, and more particularly to tunable optical filters.

BACKGROUND OF THE INVENTION

Linear Variable Filters (LVFs) are dielectric thin film filters similar to more commonly used Dense Wavelength Division Multiplexing filters (DWDM). A typical DWDM filter is a bandpass filter which allows light in a certain wavelength region, or channel, to be transmitted and rejects all other wavelengths within a specified broader wavelength region. These filters are generally etalon or Fabry-Perot cavity based in construction. A dielectric reflective layer is deposited on a substrate followed by a cavity layer and another reflective layer. This forms an etalon where the cavity layer thickness determines the center wavelength of the filter and the reflectivity of the layers determines the filter bandwidth. In order to produce a narrower filter with better out of band rejection, more cavities are added on top of the initial cavity. Of course, in order for multiple cavities to produce a narrower filter the cavity layers should have substantially the same thickness.

Linear variable filters have wedged layers. This has the effect of shifting the filter center wavelength along the wedge axis. As with DWDM filters multiple wedged layers can be stacked on one another.

A LVF can be tuned to different wavelengths by translating the incident beam or the filter in the linearly varying filter direction.

In accordance with the invention LVFs are used to create narrow bandwidth tunable spectral filters.

It is an object of the present invention to provide a linear variable filter having reduced angular and/or beam size broadening thereby minimizing the achievable filter bandwidth.

SUMMARY OF THE INVENTION

In accordance with the invention there is provided an optical filter comprising a first lens system for converting an input beam into an output beam having a substantially eccentric cross-section; and a linear variable filter for shifting a center wavelength response of said linear variable filter in a wavelength varying direction, said linear variable filter coupled to receive the output beam.

In accordance with a further embodiment of the present invention the first lens system comprises at least two lenses for shaping the output beam, said output beam being substantially focussed in the wavelength varying direction and substantially collimated in a substantially wavelength constant direction substantially perpendicular to said wavelength varying direction. The first lens system is selected from the group consisting of a cylindrical lens, a spherical lens, a biconic lens, a GRIN lens, an aspheric lens, and a GRIN cylindrical lens.

In another embodiment of the present invention, the optical filter further comprises a second lens system coupled to receive a filtered beam from the linear variable filter, said second lens system for recoupling the filtered beam, The second lens system is selected from the group of a cylindrical lens, a spherical lens, a biconic lens, a GRIN lens, an aspheric lens, and a grin cylindrical lens.

In accordance with yet a further embodiment of the present invention, the optical filter comprises means for tuning the optical filter. The means for tuning can comprise means for relatively translating the output beam and the linear variable filter in a direction substantially normal to a propagation direction of the output beam.

In accordance with another embodiment of the invention the linear variable filter is tilted about an axis in the substantially wavelength varying direction. Advantageously, this tilt is in a collimated plane of the beam.

In a further embodiment, the optical filter comprises first reflective means, such as a mirror, disposed to receive a back-reflected beam from the linear variable filter and to direct the back-reflected beam back to said linear variable filter for providing a second filtering.

If desired, the optical filter further comprises a first optical circulator disposed to provide the input beam to the first lens system and to receive a beam reflected from the linear variable filter from the second filtering, and/or a second optical circulator disposed to receive the filtered beam from the second lens system and wherein the second circulator has a second port for inputting an ADD beam.

In accordance with another embodiment, the inventive optical filter comprises second reflective means for folding an optical path, the second reflective means being disposed between the first lens system and the second lens system, such as a corner cube, an angled mirror, or a right angle prism.

In accordance with another aspect of the invention, there is provided a method for reducing at least one of a beam size broadening and an angular broadening of a linear variable optical filter comprising the steps of providing an elliptical beam to the linear variable optical filter for reducing the angular broadening, orienting a minor axis of the elliptical beam in a wavelength varying direction of the linear variable optical filter, and focusing the elliptical beam in a wavelength varying direction of the linear variable optical filter for reducing the beam size broadening, said beam being substantially collimated in the wavelength varying direction corresponding to a major axis of the elliptical beam.

In accordance with a further embodiment, the method further comprises the step of providing the elliptical beam at an optimized angle relative to the major axis of the elliptical beam.

In accordance with another embodiment, the method further comprises the step of tilting the linear variable filter about an axis in the substantially wavelength varying direction for minimizing a back-reflectance.

Furthermore, in accordance with the invention, there is provided, an optical filter comprising an input port for launching an input beam comprising a plurality of wavelengths into the optical filter, a first lens system for receiving the input beam from the input port and for providing a substantially elliptical beam, said elliptical beam being substantially focussed in a first direction and substantially collimated in a second direction substantially perpendicular to the first direction, a linear variable filter for receiving the elliptical beam from the first lens system and for substantially transmitting a selected wavelength of the plurality of wavelengths and substantially reflecting remaining wavelengths of the plurality of wavelengths, a second lens system for receiving the selected wavelength and for recoupling said selected wavelength, and an output port for receiving the selected wavelength.

In accordance with an embodiment of the invention, the optical filter comprises means for tuning said optical filter. The means for tuning comprise means for relatively translating the elliptical beam and the linear variable filter in a direction substantially normal to the propagation direction of the elliptical beam.

In accordance with an embodiment of the present invention, the first direction is a substantially wavelength varying direction and the second direction is a substantially wavelength constant direction and wherein said linear variable filter is tilted about an axis in the substantially wavelength varying direction.

In accordance with yet another embodiment of the present invention, the optical filter further comprises reflective means for receiving the reflected remaining wavelengths and for sending said reflected remaining wavelengths back to the linear variable filter for providing a second filtering for the selected wavelength.

If desired, the optical filter in accordance with the present invention comprises a first optical circulator disposed at the output port for at least one of receiving the selected wavelength and launching another signal at the selected wavelength into the optical filter, and/or a second optical circulator disposed at the input port for launching the input beam into the optical filter and for receiving at least one of the remaining wavelengths reflected from the linear variable filter from the second filtering and the other signal at the selected wavelength.

Advantageously, the apparatus and method in accordance with the present invention provides an optical filter with reduced spectral broadening from both angular and beam extent effects.

Another advantage of the present invention is that the geometry of the filter results in low back-reflectance and higher input beam power damage thresholds.

BRIEF DESCRIPTION OF THE DRAWINGS

Exemplary embodiments of the invention will now be described in conjunction with the following drawings wherein like numerals represent like elements, and wherein.

DETAILED DESCRIPTION OF THE PREFERRED EMBODIMENT

Figure 1:
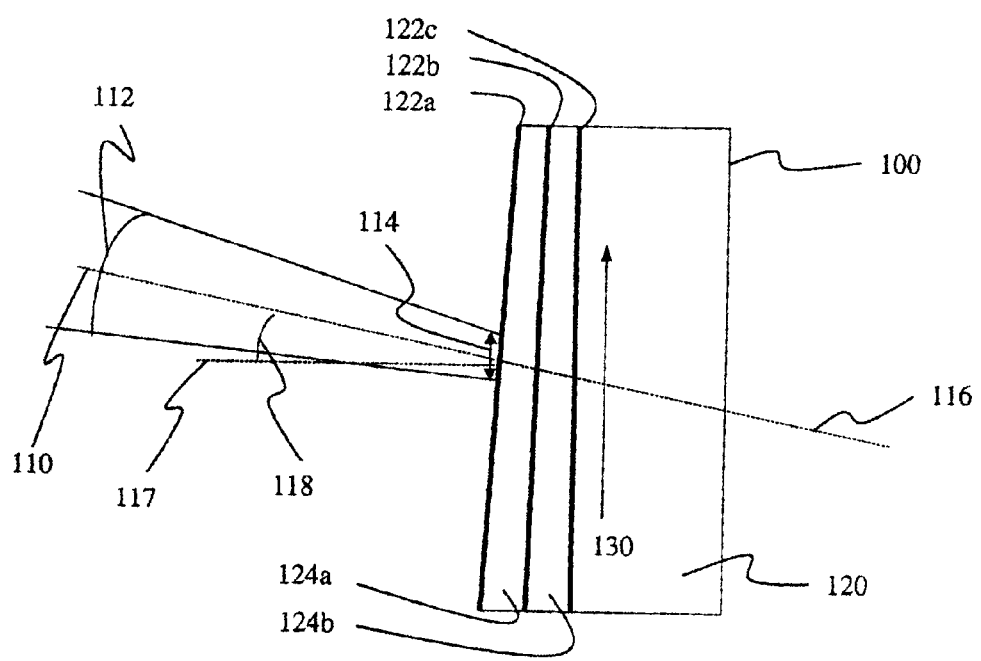
FIG. 1 presents a schematic side view of a basic geometry of a linear variable filter.

FIG. 1 presents a schematic side view of a basic geometry of a linear variable filter 100 including a substrate 120 on which three wedged dielectric reflective layers 122a–c are deposited enclosing two wedged cavities 124a and 124b therebetween. The number of dielectric reflective layers and cavities therebetween is exemplary and the invention is not intended to be limited to the example presented in FIG. 1. Arrow 130 denotes the linearly wavelength varying direction of LVF 100 with its wavelength decreasing in the direction of arrow 130. FIG. 1 further shows an incident Gaussian beam 110 having a beam divergence angle 112 and an input beam diameter 114. The incident beam 110 is further shown to have a tilt (offset) angle 118 in the plane of varying wavelength. However, as will be explained in more detail below, in accordance with the present invention an elliptical beam geometry is employed in an orthogonal plane.

As beam 110 impinges upon LVF 100 it is filtered and a light beam 116 of a selected wavelength is transmitted through LVF 100 while another portion of the input beam 110 is reflected as beam 117 containing the remaining unfiltered wavelengths. A respective wavelength is selected for filtering by translating the incident beam 110 or the filter 100 in the linearly wavelength varying filter direction 130.

Figure 2:
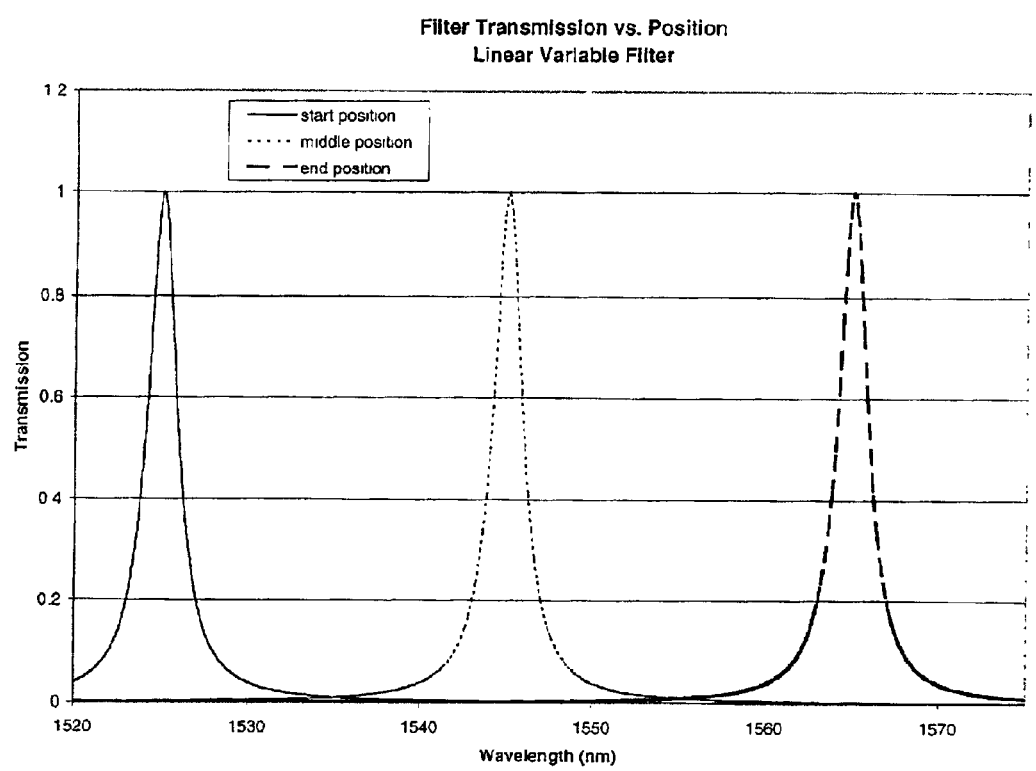
FIG. 2 shows a filter transmission of an LVF vs. the wavelength for different filter positions.

FIG. 2 shows a filter transmission of an LVF vs. the wavelength for 3 different filter positions as the filter is translated in the wavelength varying direction of an LVF filter. As can be seen from FIG. 2, a first wavelength is filtered at approximately 1525 nm, a second wavelength at approximately 1545 nm, and a third wavelength at approximately 1565 nm, corresponding to a start position, a middle position, and an end position of the LVF filter, respectively, as it is translated along the wavelength varying direction.

Three factors determine the transmission characteristics of a narrow band LVF filter. A first factor is related to intrinsic filter specifications, such as a number of cavities, reflectances, and cavity thicknesses. The other factors relate to the geometry of the beam incident on the filter and are explained in more detail below.

Figure 3:
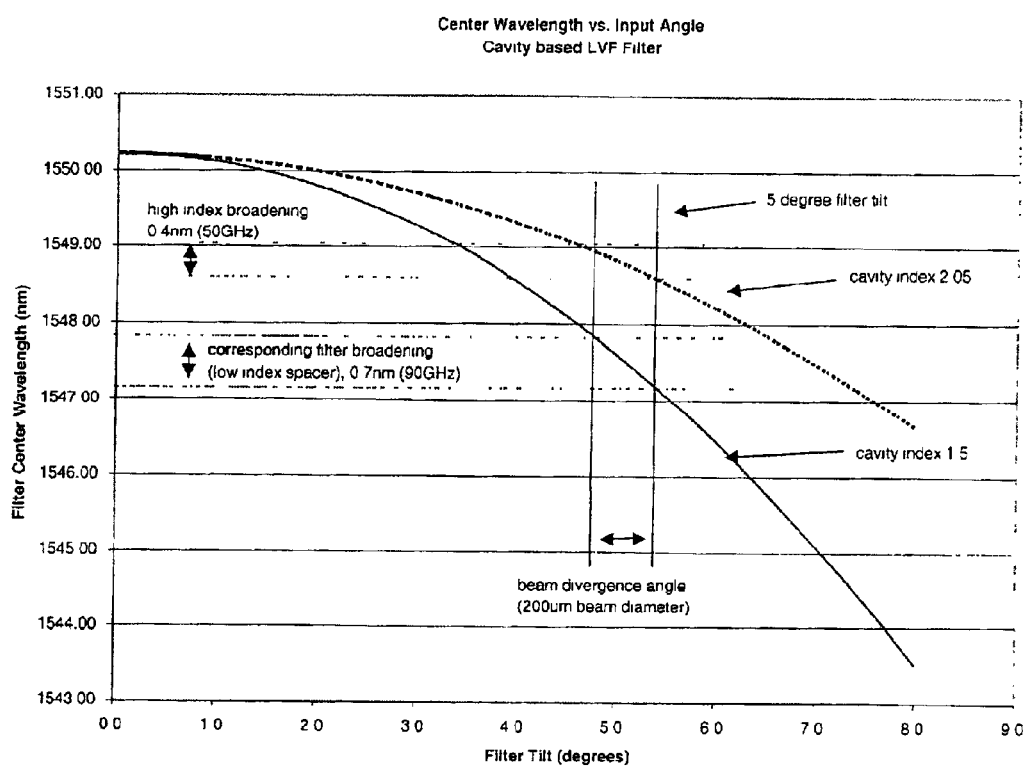
FIG. 3 shows two graphs of filter center wavelength vs. filter tilt angle for an LVF filter with different cavity indices of refraction.

FIG. 3 shows two graphs of filter center wavelength vs. filter tilt angle for an LVF filter with different cavity indices of refraction, viz. a low cavity index of 1.5 (solid line) and a high cavity index of 2.05 (dotted line). Looking at FIG. 3, it is illustrated that a higher cavity index is advantageous in reducing a respective filter broadening due to the intrinsic beam divergence angle. The example presented in FIG. 3 is based on a fiber tilt of 5 degrees and a beam divergence angle of ±0.25 degrees for a 200 μm beam diameter. It is clearly seen that the higher index cavity causes a smaller filter broadening, 0.4 nm (50 GHz), than the lower index cavity, 0.7 nm (90 GHz).

The angle of an incident beam varies the effective cavity thickness thereby shifting the filter center wavelength. The shift as a function of incident angle is given by, $$\Delta\lambda = -\lambda\theta^2/(2n^2)$$

for small angles, θ, where n is the cavity index of refraction. Curves of angle tuning are shown in conjunction with FIG. 3 for a high and low index spacer material. The filter shifting is quadratic in angle, therefore minimal shifting occurs for angles near normal incidence. However some tilt is generally required in a filter to minimize back reflectance in the optical system. FIG. 3 also demonstrates that the high index material is less sensitive to angle tuning in comparison to the lower index cavity based filter.

Gaussian beams propagating through space have a finite divergence angle which is inversely related to the spot size of the beam at the focus. The divergence half angle is given by, $$\theta_d = \lambda/(\pi w) \text{(in radians, small angle approximation)}$$

where w is the beam radius. For example, if the beam radius is 100 μm as from a collimated beam out of an SLW1.0 selfoc lens, the beam divergence is 0.005 rad, or 0.28° (@ 1550 nm). This beam divergence implies that different portions of a single Gaussian beam are exposed to different filters. To calculate the effective filter the intrinsic filter must be integrated over angular contributions of the beam. As shown in FIG. 3, the effective filter broadening for a tilt angle of 5° and a 200 μm incident beam diameter is approximately 0.7 nm and 0.4 nm for low and high index spacers respectively. Thus even if the intrinsic filter has a small band width it experiences angular broadening.

The following broadening mechanism is unique to linear variable filters. The beam incident on the filter has a finite spatial extent in the linearly wavelength varying direction of the filter. Along this direction different parts of the beam are exposed to slightly different filters. This contribution to filter broadening depends on the size of the beam and the linearly varying filter slope. The effective broadening of the filter can be estimated from, $$\Delta\lambda = \text{slope} \times 2w$$

For example, if the slope of the filter is 5 nm/mm and the beam has a radius of 100 μm, the effective broadening is approximately 1 nm.

Figure 4:
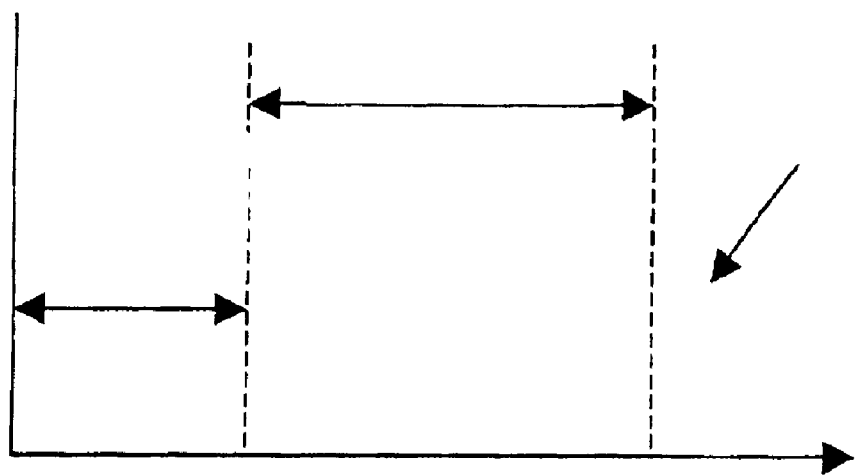
FIG. 4 presents a schematic view demonstrating a tradeoff between filter broadening due to angle effects and filter broadening due to a beam width across the LVF.

The finite beam broadening and angular broadening mechanisms must both be minimized to produce a filter which approaches the intrinsic filter. The mechanisms are both related to the incident beam geometry and are at odds. To minimize angular broadening the beam must be collimated, hence larger, which tends to increase the finite beam broadening. Ultimately the optimum beam size for the narrowest possible effective filter is one which balances these mechanisms. This tradeoff is represented conceptually in FIG. 4, showing a schematic view demonstrating a tradeoff between filter broadening due to angle effects and filter broadening due to a beam width across the LVF. It is seen from FIG. 4 that if the beam diameter becomes too small, angle effects cause a broadening, and if the beam diameter becomes too large, the size of the beam causes some broadening. Hence, it is desirable to determine an optimum beam diameter so as to reduce the filter broadening by balancing these broadening mechanisms. The determination of the optimum beam diameter is shown in more detail in conjunction with FIG. 10 below.

The spectral band width of the filter will be a combination of the intrinsic filter width, angular broadening and finite beam broadening added in quadrature as follows:

$$\text{broadened width} = \sqrt{\text{intrisic width}^2 + \text{angular broadening}^2 + \text{size broadening}^2}$$

Figure 5:
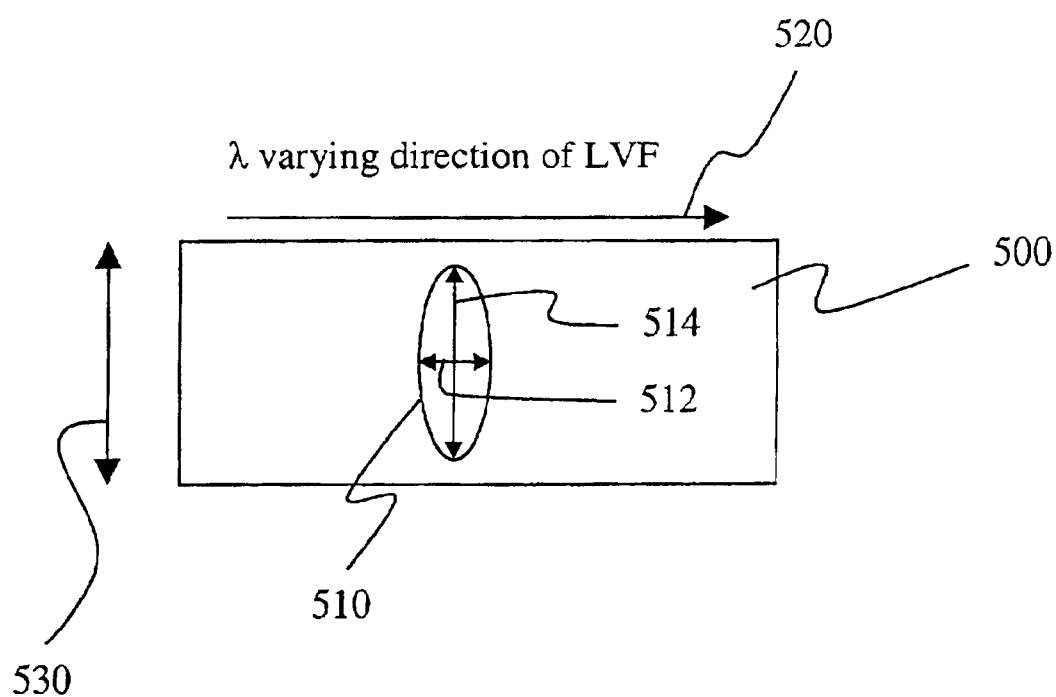
FIG. 5 shows a schematic view of an elliptical beam incident on an LVF filter with its major axis in the wavelength constant axis and its minor axis in the wavelength varying direction of the LVF.

In accordance with an embodiment of the present invention, a beam having a substantially eccentric cross-section is used, such as an elliptical beam geometry, to minimize beam broadening and angle broadening to smaller levels than is possible with a conventional circular beam. The elliptical beam geometry is shown in conjunction with FIG. 5 presenting a schematic view of an elliptical beam 510 having a major axis 514 and a minor axis 512. The elliptical beam 510 is incident on an LVF filter 500 with its major axis in the wavelength constant axis 530 and its minor axis in the wavelength varying direction of LVF filter 500. The elliptical beam geometry provides a beam with a diameter that is smaller or equal to the channel width in the direction of the minor axis 512. The beam diameter in the direction of the major axis 514 is less important since the wavelength varying direction of the LVF filter 500 is in the direction of the minor axis of elliptical beam 510.

Figure 6A:
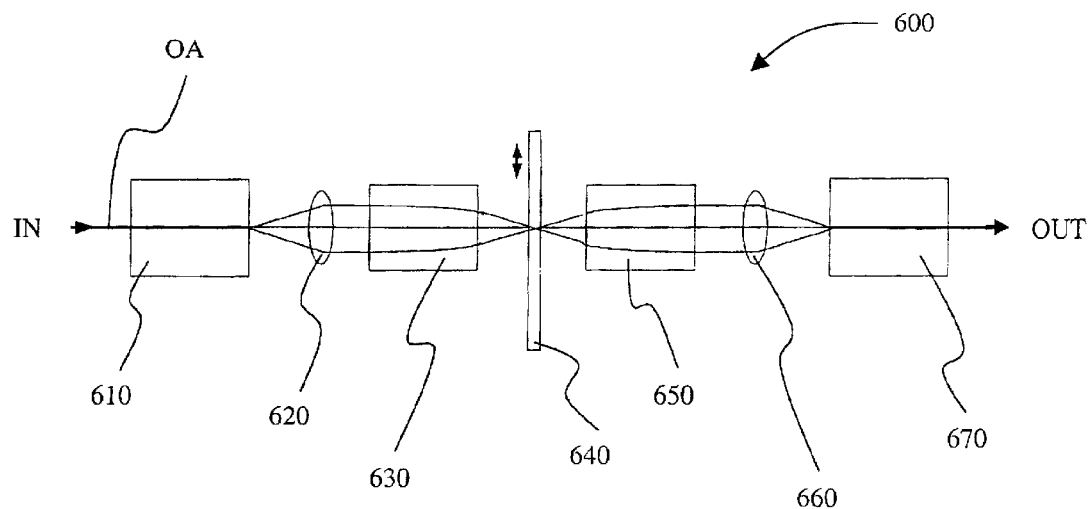
FIG. 6a shows a schematic view of LVF coupling optics with elliptical beam geometry in the horizontal (focused) plane.
Figure 6B:
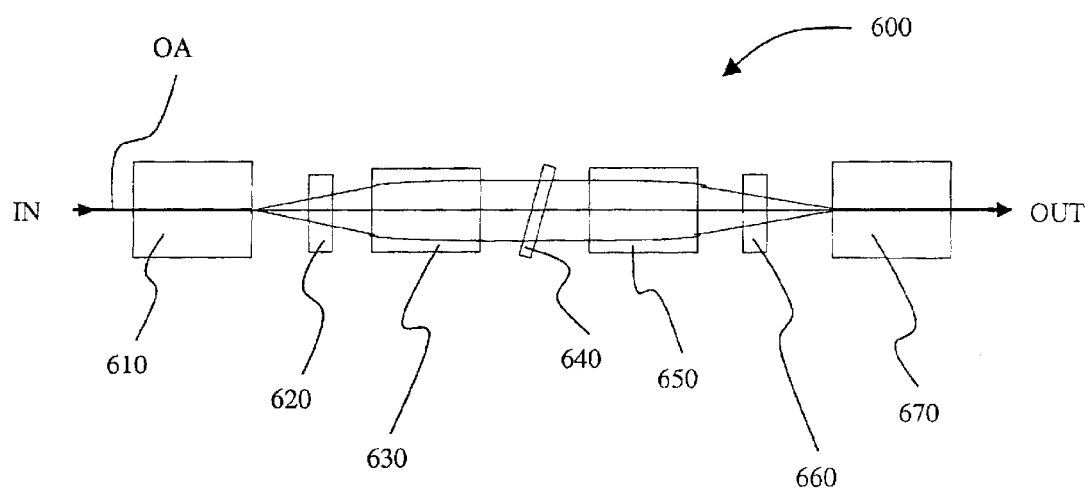
FIG. 6b shows a schematic view of LVF coupling optics with elliptical beam geometry in the vertical (collimated) plane.

FIGS. 6a and 6b depict an apparatus and a method of achieving an elliptical beam geometry on an LVF filter. FIG. 6a shows a schematic view of LVF coupling optics 600 with elliptical beam geometry in the horizontal (focused) plane to achieve an elliptical beam geometry on LVF filter 640 and FIG. 6b shows a schematic view of LVF coupling optics 600 with elliptical beam geometry in the vertical (collimated) plane. Light is incident from a fiber of fiber tube 610 on to a cylindrical lens 620 and then through a GRIN lens 630 onto the LVF filter 640. In the horizontal plane the combination of lenses 620 and 630 acts to focus the beam onto the LVF 640. In the vertical plane, the cylindrical lens 620 has no focussing effect and the GRIN lens 630 collimates the light. LVF filter 640 is translated normal to the optical axis OA to achieve a spectral tuning of the center wavelength of LVF 640. The output light is then coupled to an output fiber in fiber tube 670 with a second GRIN lens 650 and a cylindrical lens 660.

Tilting the filter in the plane of the major axis of the elliptical beam and the optical axis minimizes the back reflectance to the input optics.

Alternatively other techniques or elements are used for creating this geometry. For example, conventional lenses, such as spherical or aspherical lenses, can be used rather than GRIN lenses. The term conventional lens is used herein to denote a lens with a focal length that is independent of the plane, horizontal or vertical, of the incident light.

Further, in accordance with another embodiment of the present invention, the cylindrical and GRIN lens positions can be reversed to achieve the same effect.

Figure 7:
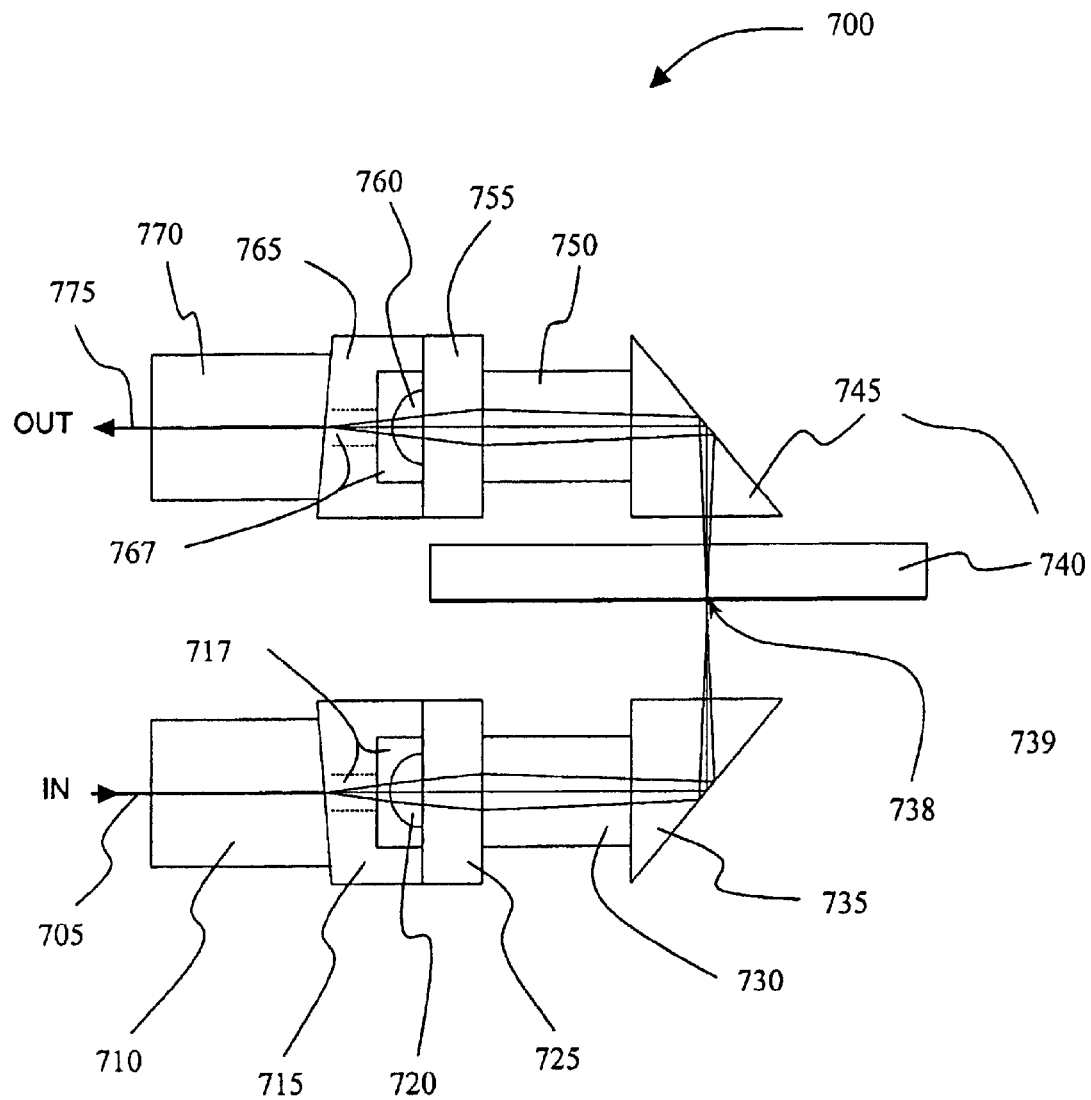
FIG. 7 illustrates another embodiment of an optical arrangement of LVF coupling optics in accordance with the present invention having a folded beam path.

FIG. 7 illustrates another embodiment of an optical arrangement of LVF coupling optics 700 in the focused plane with a folded beam path in accordance with the present invention. An input beam is launched into input fiber 705 supported in a fiber tube 710. A spacer 715 is used to separate the input fiber 705 and input fiber tube 710 from a cylindrical microlens 720. The light path between the input fiber 705/input fiber tube 710 and the cylindrical microlens 720 is an air gap 717 provided in the spacer 715. The spacer 715 can be made from a glass or metal material, for example. If desired, a glue material is used instead of the spacer 715. The light propagates from the cylindrical microlens 720 to GRIN lens 730. A glass plate 725 is used to bond the spacer 715, the cylindrical microlens 720, and the GRIN lens 730 together. A prism 735 is used to redirect the light from the GRIN lens 730 to LVF 740 by total internal reflection and hence folding the optical path. The elliptical beam has a focus 738 at an input face 739 of LVF 740. LVF 740 is translated by a stepper motor, for example, so as to shift the center wavelength of LVF 740. The light exiting from LVF 740 propagates to another prism 745 that folds the light path a second time by total internal reflection. The light propagates to output fiber 775 supported in output fiber tube 770 via GRIN lens 750 and a cylindrical microlens 760. A spacer 765 is used to separate the cylindrical microlens 760 from the output fiber tube 770 supporting the output fiber 775. An air gap 767 is provided within spacer 765. The spacer 765, the cylindrical microlens 760, and GRIN lens 750 are attached together by a glass plate 755.

The use of glass plates 725 and 755 and spacers 715 and 765 describes one convenient way of implementing the described elliptical beam geometry and connecting the optical elements. The use of spacers and glass plates is not necessary to implement the present invention and hence the invention is not intended to be limited to the use of these elements.

The folded geometry in accordance with the embodiment of the invention described in FIG. 7 enables the input and output fibers to be placed on the same side of the device 700. This geometry is functionally equivalent to the unfolded geometry described in conjunction with FIG. 6a and FIG. 6b.

The effective filter produced by an elliptical beam geometry is discussed in more detail hereafter. The finite beam broadening effect is minimized by focusing the beam to a small spot in the linearly wavelength varying filter direction. This also generates a large beam divergence in this plane. As an example, a 50 $\mu$m×200 $\mu$m elliptical beam is considered. A 50 $\mu$m focussed beam diameter has a divergence half angle of 1°. In the collimated orthogonal plane, a 200 $\mu$m beam diameter results in a much smaller divergence half angle of 0.25°. The effective angle of the beam relative to the filter is a compound angle. In the collimated direction, the beam has an incident angle of 5° from the filter tilt. When adding an orthogonal contribution from the 1° beam divergence, the resultant angle is only 5.1°. Even though the beam is highly divergent, the effective angle of various beam contributions varies only slightly from the nominal 5°. Even though the angular extent in the collimated plane is much smaller (±0.25°) this causes a greater spread in beam angles (from 4.75°–5.25°). A larger beam eccentricity can be used to eliminate this factor. A graphical representation of the elliptical beam in angular space is shown in conjunction with FIG. 8. The equivalent circular beam has input angles ranging from 4° to 6° and hence inducing more severe spectral broadening.

Figure 8:
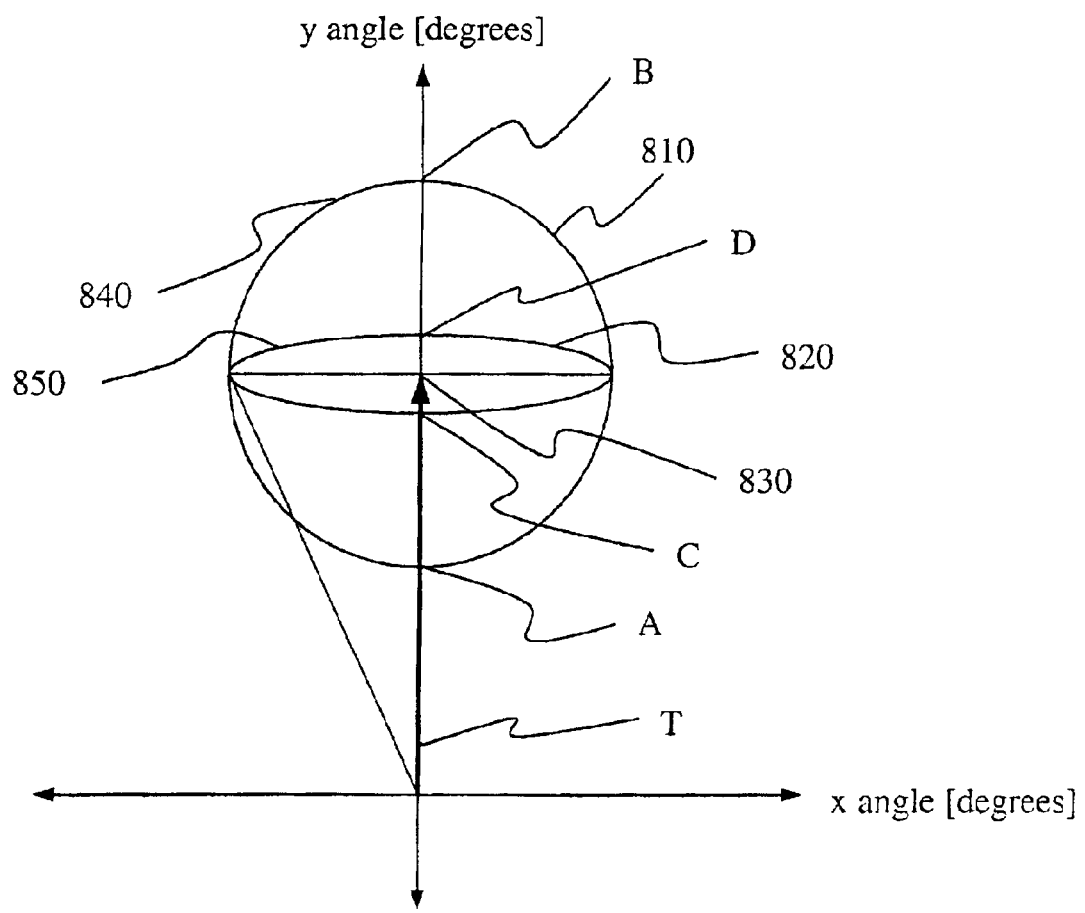
FIG. 8 shows a diagrammatic representation of an elliptical and a circular beam and their angular extents.

FIG. 8 shows a diagrammatic representation of a circular beam 810 and an elliptical beam 820 and their angular extents, 2 deg.×2 deg. and 2 deg.×0.5 deg., respectively. It is noted that the major axis of the elliptical beam in spatial (rather than angular) coordinates is located along the y-axis.

By tilting the filter becomes more sensitive to angle effects as was demonstrated heretofore in conjunction with FIG. 3. Arrow T denotes an offset angle of 5 degrees for the filter and as a result of tilting the filter, a center of the circular and elliptical beam 830 is shifted upwards along the y angle axis. When comparing an edge 840 of the circular beam 810 to an edge 850 of the elliptical beam 820, it is apparent that the circular beam 810 has a much larger angular extent, viz. from 4 degrees at point A to 6 degrees at point B, than the elliptical beam 820, viz. from 4.75 degrees at point C to 5.25 degrees at point D. This demonstrates that the variation in input angle of an elliptical beam is much smaller than for a circular beam and hence an elliptical beam geometry is used to reduce an angular broadening.

Figure 9:
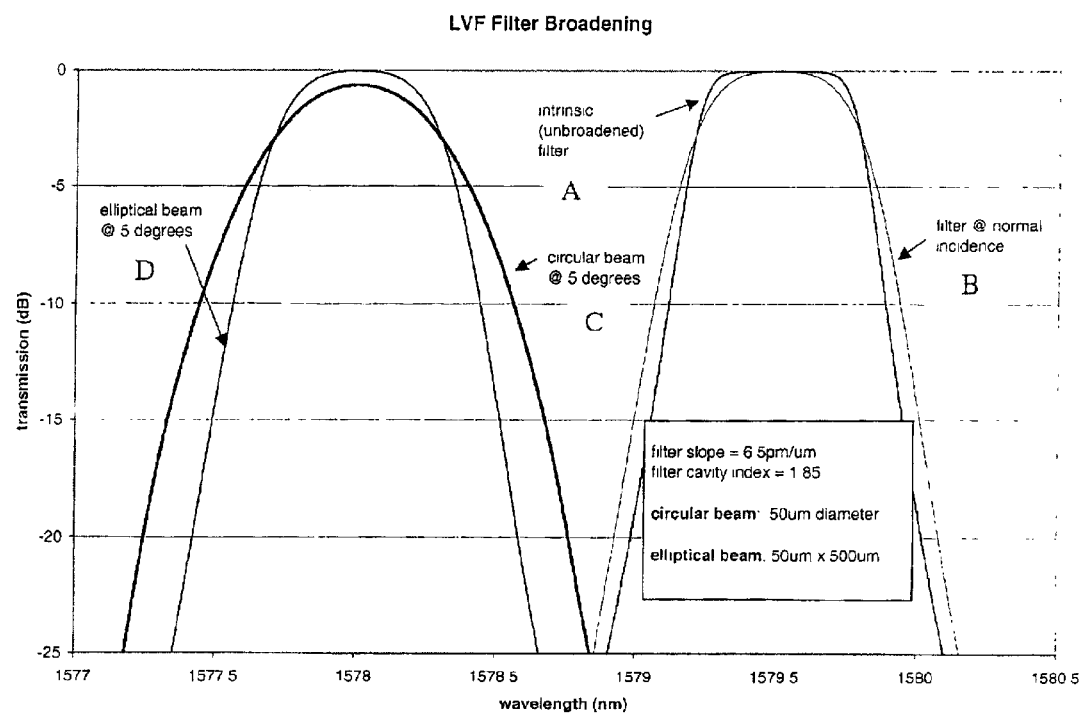
FIG. 9 presents graphs of insertion loss vs. wavelength for a narrow band filter for circular and elliptical beam geometry.

FIG. 9 presents four graphs of insertion loss vs. wavelength for a narrow band filter for circular and elliptical beam geometry to further demonstrate the advantage of the elliptical beam geometry. The graph for the intrinsic, unbroadened filter is denoted with A. However, at normal incidence the intrinsic filter is broadened by the LVF due to the finite spatial extent of the beam, as presented in graph B. At an angle of incidence of 5°, angle broadening severely broadens the filter for the circular beam, graph C, and has a minimal effect on the elliptical beam, graph D. With this geometry the intrinsic filter is shifted substantially (1.5 nm), however all the components of the beam are shifted by almost the same amount. Therefore, the narrow intrinsic filter is not substantially broadened for the elliptical beam.

As with a circular beam the optimum beam geometry results when the finite beam extent broadening and angular broadening effects are approximately equal. Of course, this will occur for an elliptical beam which has a much smaller minor diameter than the equivalent circular beam ultimately resulting in a narrower spectral filter.

Figure 10:
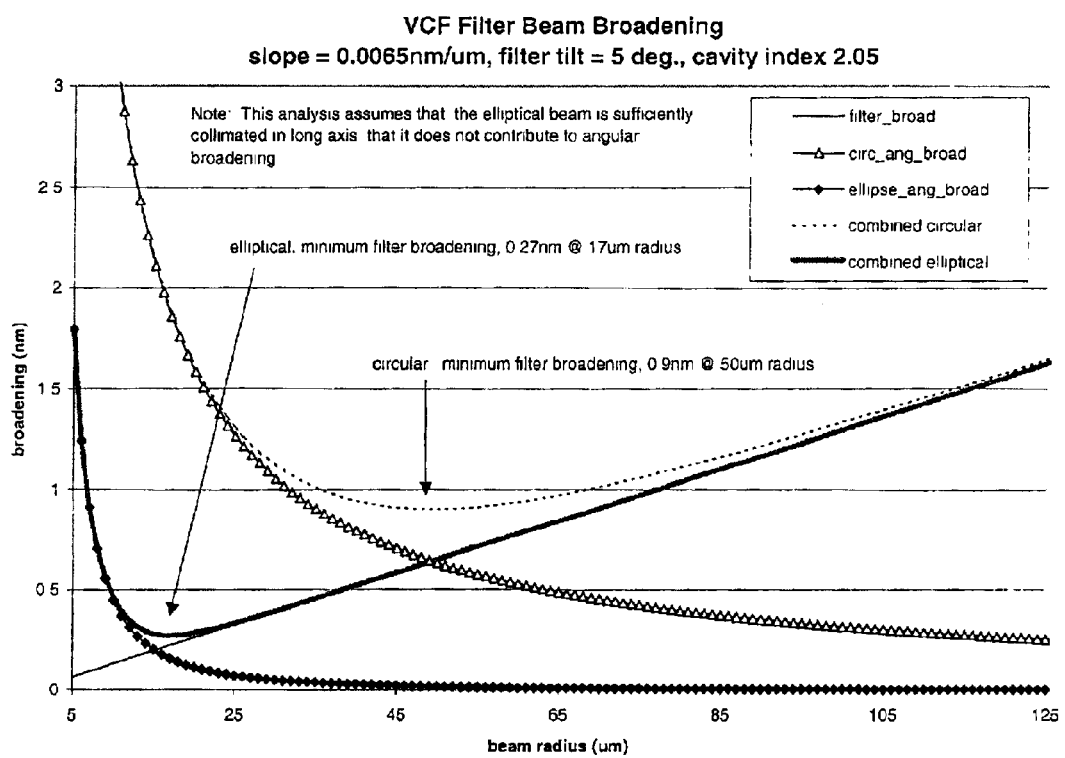
FIG. 10 shows graphs representing an angular and finite beam broadening as a function of input beam radius for elliptical and circular input beams.

FIG. 10 shows graphs representing an angular and finite beam broadening as a function of input beam radius for elliptical and circular input beams. The intrinsic (unbroadened) filter is shown compared with the broadened filter at normal incidence for which angle broadening is negligible. The elliptical beam geometry is seen to produce less filter broadening than a circular beam when the angle of incidence is 5°. This analysis excludes walk-off induced loss which will increase with the angle of incidence. It is further noted that the analysis shown in FIG. 10 assumes that the elliptical beam is sufficiently collimated in its major axis and that it does not contribute to angular broadening.

In FIG. 10 the effects of angular and finite beam size broadening are shown for various beam radii in elliptical and circular geometries. The angular broadening for a circular beam can be estimated by:

$$\Delta\lambda \text{circular} = (\lambda/2n^2)(\theta^2_{max} - \theta^2_{min})$$
$$= (\lambda/2n^2)((\theta+\theta_d)^2 - (\theta-\theta_d)^2)$$
$$= (2\lambda^2\theta)/(\pi w n^2)$$

where $\theta$ is the tilt angle, $\theta_d$ is the beam divergence angle, and w is the beam radius, and n is the cavity index. This equation is based on the tilt induced wavelength shift as seen in FIG. 3. The reduced equation assumes the tilt angle is larger than the beam divergence half angle. Note that this is a necessary requirement to effectively reduce the back reflectance.

In comparison for an elliptical beam, where the beam is sufficiently collimated along the long (major) axis that its divergence can be neglected, the broadening is $$\Delta\lambda \text{elliptical} = (\lambda/2n^2)(\theta^2_{max} - \theta^2_{min})$$

$$= (\lambda/2n^2)((\theta^2 + \theta x^2)^{1/2} - (\theta^2 - \theta x^2)^{1/2})$$

$$= \lambda^3/[2(\pi n w)^2]$$

where $\theta x$ is the beam divergence in the focused axis, $\theta x = \lambda/(\pi w)$, and w is the minor axis beam radius. This equation assumes $\theta x << \theta$ and adequate collimation in the long (major) beam axis. In order to assure adequate collimation in the long (major) axis, the beam divergence, $\theta y$, along this axis (y) must satisfy:

$$\theta y < \text{sqrt}(\theta x^2 + \theta^2) - \theta,$$

where $\theta$ is the tilt angle and $\theta x$ is the beam divergence in the focused axis.

This defines the minimum eccentricity of the beam for the elliptical beam geometry to be most effective. The elliptical beam broadening has no dependence on the tilt angle. In fact, it is equivalent to the broadening of a circular beam with the same radius as the minor ellipse axis when there is no filter tilt.

In FIG. 10, the finite beam size broadening and angular broadening are added in quadrature to produce a total effective broadening. For a given slope, tilt and cavity index parameters the optimum elliptical beam has a minor axis radius of 17 $\mu$m and an effective broadening of 0.27 nm. This compares with a circular beam broadening of over 3 times more (0.9 nm) for a 50 $\mu$m radius. The intrinsic filter bandwidth must be added in quadrature to the filter/angular broadening values to derive the effective filter bandwidth. For example, if the intrinsic filter is 0.3 nm, and the elliptical beam broadening is 0.27 nm, the effective filter is approximately 0.4 nm wide. To derive the exact bandwidth and filter shape, the intrinsic filter must be convolved over the spatial and angular distributions of the beam as was done for FIG. 9. In general, if the estimated filter broadening is much smaller, for example by a factor of 3 or more, than the intrinsic filter, it will not be substantially broadened.

Thus, the elliptical beam geometry takes full advantage in optimizing filter performance. With this geometry a narrow bandwidth filter can be obtained whilst maintaining good back reflectance characteristics. Furthermore, relative to a circular beam with the same minor diameter the elliptical beam has a larger spatial extent. This reduces the power density on the LVF filter by the aspect ratio of the beam resulting in an increased power handling capability.

Figure 11:
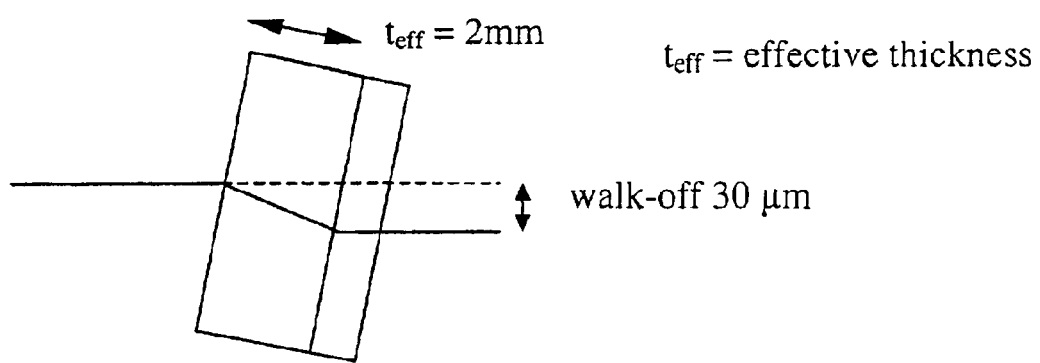
FIG. 11 shows a schematic view demonstrating how an elliptical beam geometry reduces the sensitivity to walk-off effects in the tilted filter plane.

FIG. 11 shows a schematic view demonstrating how an elliptical beam geometry reduces the sensitivity to walk-off effects in the tilted filter plane. Narrow band dielectric filters have a large effective optical thickness which induces beam walk-off when the filter is tilted, as shown in FIG. 11. The walk-off tends to have a negative effect on filter performance and distorts the output beam. These effects are minimized when the physical walk-off is small relative to the beam diameter. The elliptical beam geometry minimizes the negative influence of walk-off by placing the major axis of the beam in the plane of the tilt axis.

Figure 12:
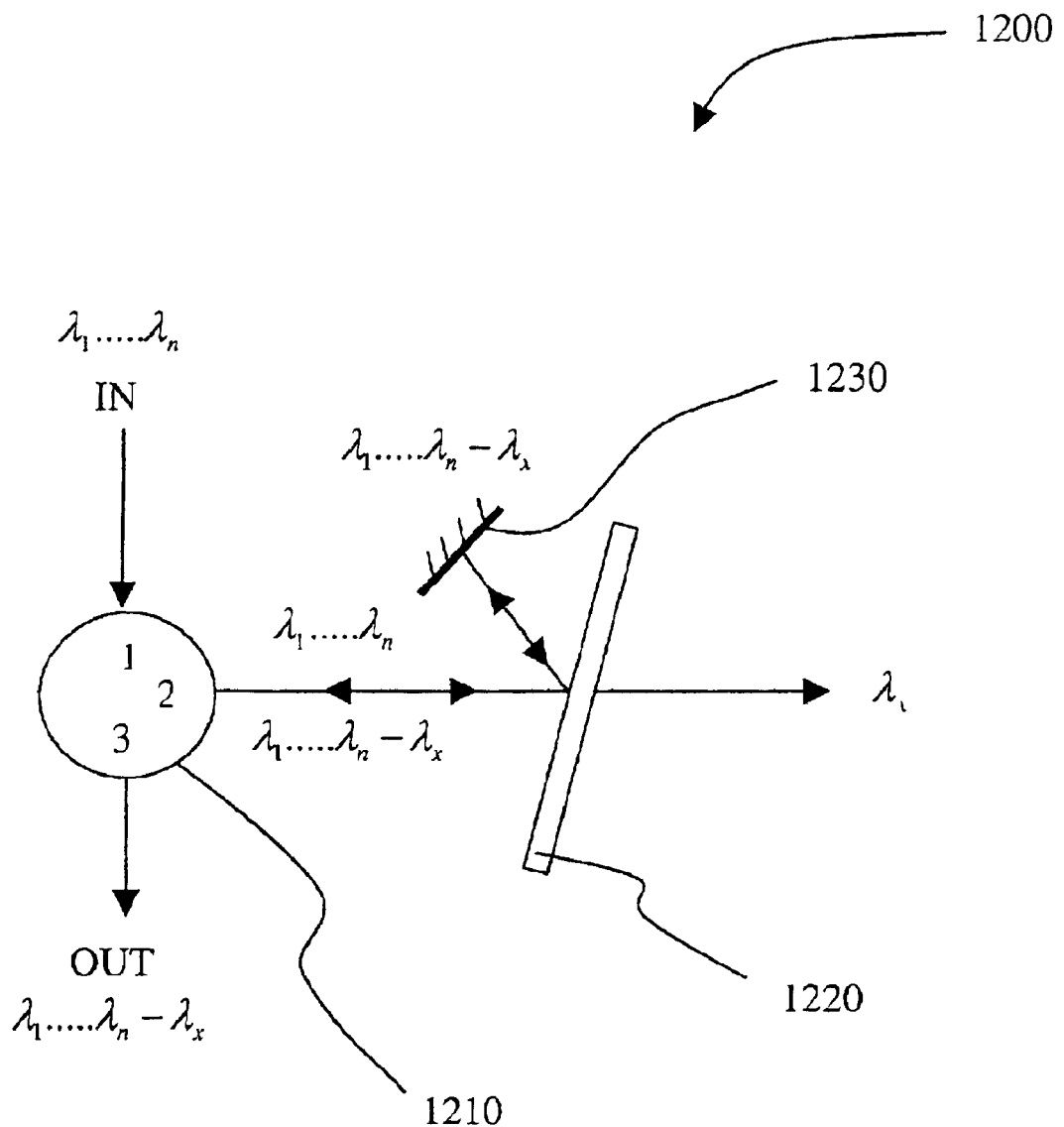
FIG. 12 shows a simplified schematic view of another optical arrangement in accordance with the present invention including means for recapturing back-reflected light.

FIG. 12 shows a simplified schematic view of another optical arrangement 1200 in accordance with the present invention including means for recapturing back-reflected light. A light beam including a plurality of wavelength $\lambda_1 \ldots \lambda_n$ is launched into port 1 of circulator 1210. The light beam exits the circulator 1210 at port 2 and is directed towards LVF 1220 via a cylindrical lens and GRIN lens. Both, the cylindrical lens and the GRIN lens are not shown in FIG. 12 for ease of illustration. When the light beam including the plurality of wavelength impinges upon LVF 1220, a selected wavelength $\lambda_x$ is transmitted through LVF 1220 and the remaining wavelength $\lambda_1 \ldots \lambda_n - \lambda_x$ are reflected from the tilted LVF 1220 and are directed towards a mirror 1230. Mirror 1230 is disposed approximately one focal length away from LVF 1220. At the mirror 1230, the light beam including the remaining wavelength $\lambda_1 \ldots \lambda_n - \lambda_x$ is reflected back towards LVF 1220. This allows for a second filtering of remnant wavelength $\lambda_x$ at the LVF 1220. The remaining wavelength $\lambda_1 \ldots \lambda_n - \lambda_x$ are then reflected back from LVF 1220 towards port 2 of circulator 1210 so that they can be re-captured at port 3 of circulator 1210. Advantageously, this optical arrangement 1200 provides a double filtering process for a predetermined wavelength so as to ensure that no residual light of the predetermined wavelength remains within the back-reflected light, and further it provides for a re-capturing of the back-reflected light.

Figure 13:
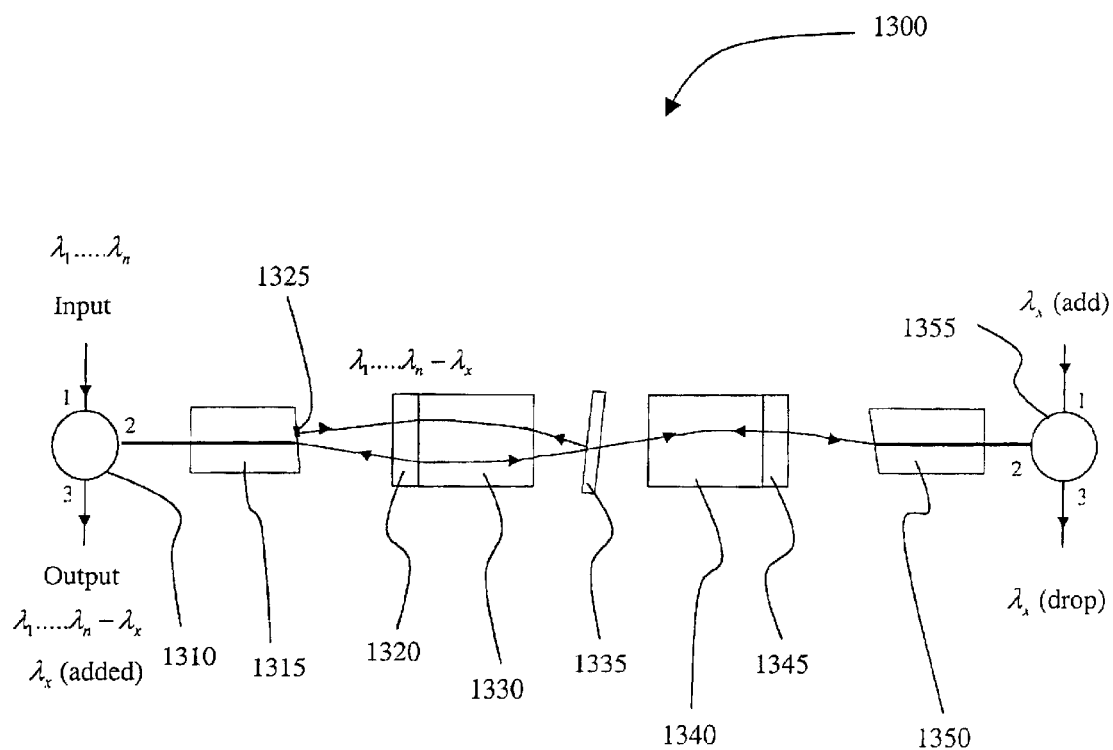
FIG. 13 presents a schematic view of another optical arrangement in accordance with the present invention including means for re-capturing back-reflected light and further providing add/drop functionality.

FIG. 13 presents a schematic view of another optical arrangement 1300 in accordance with the present invention including means for re-capturing back-reflected light and further providing add/drop functionality. A beam of light including a plurality of wavelength $\lambda_1 \ldots \lambda_n$ is launched into port 1 of an optical circulator 1310 and exits at port 2 to be directed to LVF 1335 via fiber tube 1315, cylindrical lens 1320, and GRIN lens 1330. Upon impinging on LVF 1335, a pre-selected wavelength $\lambda_x$ is transmitted therethrough while the remaining wavelength $\lambda_1 \ldots \lambda_n - \lambda_x$ are reflected from LVF 1335. The reflected light beam containing the remaining wavelength $\lambda_1 \ldots \lambda_n - \lambda_1$ travels to a mirror 1325, provided on an end face of fiber tube 1315, via the GRIN lens 1330 and the cylindrical lens 1320. Mirror 1325 sends the light beam containing the remaining wavelength $\lambda_1 \ldots \lambda_n - \lambda_x$ back to LVF 1335 where a second filtering for $\lambda_x$ occurs. The remaining wavelength $\lambda_1 \ldots \lambda_n - \lambda_x$ are directed back to port 2 of circulator 1310 via GRIN lens 1330, cylindrical lens 1320, and fiber tube 1315 and then are circulated to port 3 of circulator 1310 to exit device 1300.

The light of wavelength $\lambda_x$ that is transmitted/filtered through LVF 1335 is directed to port 2 of a second circulator 1355 where it is circulated to port 3 to exit device 1300. Furthermore, in accordance with the embodiment presented in FIG. 13, a new wavelength $\lambda_x$ can be added to the signal. The added channel $\lambda_x$ is launched into port 1 of circulator 1355 and then directed out of port 2 of circulator 1355 to port 2 of circulator 1310 via fiber tube 1350, cylindrical lens 1345, GRIN lens 1340, LVF 1335, GRIN lens 1330, cylindrical lens 1320, and fiber tube 1315. The added channel $\lambda_x$ is circulated from port 2 of circulator 1310 to port 3 where it exits device 1300 together with the back-reflected light of wavelengths $\lambda_1 \ldots \lambda_n - \lambda_x$.

A further advantage of the tunable filter in accordance with the present invention is its small package size. By reducing beam broadening effects, the LVF wavelength slope (d$\lambda$/dl) can be increased in the elliptical beam geometry as in comparison to a conventional circular beam geometry. This effectively reduces the filter length required to achieve a given wavelength tuning range.

The above described embodiments of the invention are intended to be examples of the present invention and numerous modifications, variations, and adaptations may be made to the particular embodiments of the invention without departing from the spirit and scope of the invention, which is defined in the claims.

What is claimed is:

1. An optical filter comprising:
   a first lens system for converting an input beam into an output beam having a substantially eccentric cross-section; and
   a linear variable filter for shifting a center wavelength response of said linear variable filter in a wavelength varying direction, said linear variable filter coupled to receive the output beam.

2. The optical filter as defined in claim 1 wherein the first lens system comprises at least two lenses for shaping the output beam, said output beam being substantially focussed in the wavelength varying direction and substantially collimated in a substantially wavelength constant direction substantially perpendicular to said wavelength varying direction.

3. The optical filter as defined in claim 2 wherein the first lens system is selected from the group consisting of a cylindrical lens, a spherical lens, a biconic lens, a GRIN lens, an aspheric lens, and a GRIN cylindrical lens.

4. The optical filter as defined in claim 2 further comprising a second lens system coupled to receive a filtered beam from the linear variable filter, said second lens system for recoupling the filtered beam.

5. The optical filter as defined in claim 4 wherein the second lens system is selected from the group of a cylindrical lens, a spherical lens, a biconic lens, a GRIN lens, an aspheric lens, and a grin cylindrical lens.

6. The optical filter as defined in claim 2 further comprising means for tuning the optical filter.

7. The optical filter as defined in claim 6 wherein the means for tuning comprise means for relatively translating the output beam and the linear variable filter in a direction substantially normal to a propagation direction of the output beam.

8. The optical filter as defined in claim 7 wherein the means for translating is a stepper motor.

9. The optical filter as defined in claim 7 wherein the linear variable filter is tilted about an axis in the substantially wavelength varying direction.

10. The optical filter as defined in claim 7 further comprising first reflective means disposed to receive a back-reflected beam from the linear variable filter and to direct the back-reflected beam back to said linear variable filter for providing a second filtering.

11. The optical filter as defined in claim 10 wherein the first reflective means is a mirror.

12. The optical filter as defined in claim 10 further comprising a first optical circulator disposed to provide the input beam to the first lens system and to receive a beam reflected from the linear variable filter from the second filtering.

13. The optical filter as defined in claim 12 further comprising a second optical circulator disposed to receive the filtered beam from the second lens system and wherein the second circulator has a second port for inputting an ADD beam.

14. The optical filter as defined in claim 4 further comprising second reflective means for folding an optical path, the second reflective means being disposed between the first lens system and the second lens system.

15. The optical filter as defined in claim 14 wherein the second reflective means is one of a corner cube, an angled mirror, and a right angle prism.

16. A method for reducing at least one of a beam size broadening and an angular broadening of a linear variable optical filter comprising the steps of:
   providing an elliptical beam to the linear variable optical filter for reducing the angular broadening;
   orienting a minor axis of the elliptical beam in a wavelength varying direction of the linear variable optical filter; and
   focusing the elliptical beam in a wavelength varying direction of the linear variable optical filter for reducing the beam size broadening, said beam being substantially collimated in the wavelength varying direction corresponding to a major axis of the elliptical beam.

17. The method as defined in claim 16 further comprising the step of providing the elliptical beam at an optimized angle relative to the major axis of the elliptical beam.

18. The method as defined in claim 17 further comprising the step of tilting the linear variable filter about an axis in the substantially wavelength varying direction for minimizing a back-reflectance.

19. An optical filter comprising:
   an input port for launching an input beam comprising a plurality of wavelengths into the optical filter;
   a first lens system for receiving the input beam from the input port and for providing a substantially elliptical beam, said elliptical beam being substantially focussed in a first direction and substantially collimated in a second direction substantially perpendicular to the first direction;
   a linear variable filter for receiving the elliptical beam from the first lens system and for substantially transmitting a selected wavelength of the plurality of wavelengths and substantially reflecting remaining wavelengths of the plurality of wavelengths;
   a second lens system for receiving the selected wavelength and for recoupling said selected wavelength; and
   an output port for receiving the selected wavelength.

20. The optical filter as defined in claim 19 further comprising means for tuning said optical filter.

21. The optical filter as defined in claim 20 wherein the means for tuning comprise means for relatively translating the elliptical beam and the linear variable filter in a direction substantially normal to the propagation direction of the elliptical beam.

22. The optical filter as defined in claim 21 wherein the first direction is a substantially wavelength varying direction and the second direction is a substantially wavelength constant direction and wherein said linear variable filter is tilted about an axis in the substantially wavelength varying direction.

23. The optical filter as defined in claim 22 further comprising reflective means for receiving the reflected remaining wavelengths and for sending said reflected remaining wavelengths back to the linear variable filter for providing a second filtering for the selected wavelength.

24. The optical filter as defined in claim 23 further comprising a first optical circulator disposed at the output port for at least one of receiving the selected wavelength and launching another signal at the selected wavelength into the optical filter.

25. The optical filter as defined in claim 24 further comprising a second optical circulator disposed at the input port for launching the input beam into the optical filter and for receiving at least one of the remaining wavelengths reflected from the linear variable filter from the second filtering and the other signal at the selected wavelength.

26. The optical filter as defined in claim 1, wherein the output beam is defined by a minor axis and a major axis; and wherein the minor axis of the output beam is disposed in the wavelength varying direction of the linear variable filter.

27. The optical filter as defined in claim 19, wherein the output beam is defined by a minor axis and a major axis; and wherein the minor axis of the output beam is disposed in the wavelength varying direction of the linear variable filter.

* * * * *